United States Patent
Haut (10) Patent No.: US 8,256,836 B2
(45) Date of Patent: Sep. 4, 2012

(54) CHILD SAFETY SEAT

(75) Inventor: Robert Evan Haut, West Chester, PA (US)

(73) Assignee: Wonderland Nurserygoods Co., Ltd., Neihu, Taipei (TW)

( * ) Notice: Subject to any disclaimer, the term of this patent is extended or adjusted under 35 U.S.C. 154(b) by 0 days.

(21) Appl. No.: 13/280,348

(22) Filed: Oct. 25, 2011

(65) Prior Publication Data

US 2012/0038191 A1 Feb. 16, 2012

Related U.S. Application Data (60) Continuation of application No. 13/018,426, filed on Feb. 1, 2011, which is a division of application No. 12/264,269, filed on Nov. 4, 2008, now abandoned.

(60) Provisional application No. 60/985,284, filed on Nov. 4, 2007.

(51) Int. Cl.
 *A47C 7/72* (2006.01)
(52) U.S. Cl. .................. 297/188.14; 297/411.2
(58) Field of Classification Search .............. 297/188.14, 297/188.15, 188.16, 188.17, 411.26, 411.27, 297/411.23
See application file for complete search history.

(56) References Cited

U.S. PATENT DOCUMENTS

| | | | |
|---|---|---|---|
| 3,233,940 A | 2/1966 | Tooley | |
| 5,419,617 A | 5/1995 | Schultz | |
| 6,045,183 A * | 4/2000 | Weber | 297/250.1 |
| 6,474,735 B1 | 11/2002 | Carnahan | |
| 6,478,372 B1 | 11/2002 | Lemmeyer | |
| 6,648,194 B2 | 11/2003 | Schaal | |
| 6,857,700 B2 * | 2/2005 | Eastman et al. | 297/250.1 |
| 6,962,393 B2 | 11/2005 | Amirault | |
| 7,407,232 B2 * | 8/2008 | Sakamoto et al. | 297/411.2 |
| 7,810,883 B2 | 10/2010 | Berger | |
| 2003/0075957 A1 | 4/2003 | Kain | |
| 2004/0070244 A1 | 4/2004 | Williams | |
| 2004/0090094 A1 | 5/2004 | Williams | |
| 2006/0138814 A1 | 6/2006 | Burbrink | |

FOREIGN PATENT DOCUMENTS

| | | |
|---|---|---|
| DE | 296 05 953 U1 | 7/1996 |
| DE | 296 13 988 U1 | 10/1996 |
| GB | 2 350 292 A | 11/2000 |
| GB | 2 362 094 A | 11/2001 |
| WO | 2008005608 A2 | 1/2008 |
| WO | 2008005608 A3 | 1/2008 |

* cited by examiner

*Primary Examiner* — Sarah B McPartlin
(74) *Attorney, Agent, or Firm* — Winston Hsu; Scott Margo (57) ABSTRACT

A child safety seat includes a seating base, an armrest base, and a storage structure. The armrest base is disposed on a side of the seating base. The storage structure is pivotally connected to the armrest base. A first storage space and a second storage space are formed in the storage structure. The first storage space and the second storage space are located on different planes of the storage structure. The storage structure is lay down at a side of the armrest base that is located substantially on the same plane with the seating base and an opening of the first storage space faces up when the storage structure is in a first position. The storage structure is standing on the side of the armrest base and an opening of the second storage space of the storage structure faces up when the storage structure is in a second position.

1 Claim, 14 Drawing Sheets

CHILD SAFETY SEAT

CROSS REFERENCE TO RELATED APPLICATIONS

This application is a continuation application of U.S. application Ser. No. 13/018,426 filed on Feb. 1, 2011, which itself is a division of U.S. application Ser. No. 12/264,269 filed on Nov. 4, 2008, which claims the benefit of U.S. Provisional Application No. 60/985,284 filed on Nov. 4, 2007. The entire contents of this application are hereby incorporated by reference.

BACKGROUND OF THE INVENTION

1. Field of the Invention

The present invention relates to a child safety seat, and more specifically, to a child safety seat having storage space.

2. Description of the Prior Art

A traditional child safety seat usually has a complicated safety design for protecting a baby from being hit in a car accident. However, besides the said safety design, other auxiliary structures on a child safety seat for helping parents take care of the baby or allowing the baby to do some recreational activities are not commonly seen. Thus, how to make a child safety seat more convenient in use should be a concern in safety seat structural design.

SUMMARY OF THE INVENTION

The present invention provides a child safety seat includes a seating base, an armrest base, and a storage structure. The armrest base is disposed on a side of the seating base. The storage structure is pivotally connected to the armrest base for rotating between a first position and a second position. A first storage space and a second storage space are formed in the storage structure. The first storage space and the second storage space are located on different planes of the storage structure. When the storage structure is in the first position, the storage structure is lay down at a side of the armrest base that is located substantially on the same plane with the seating base and an opening of the first storage space faces up for storing objects. When the storage structure is in the second position, the storage structure is standing on the side of the armrest base for forming a part of the armrest base and an opening of the second storage space of the storage structure faces up.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
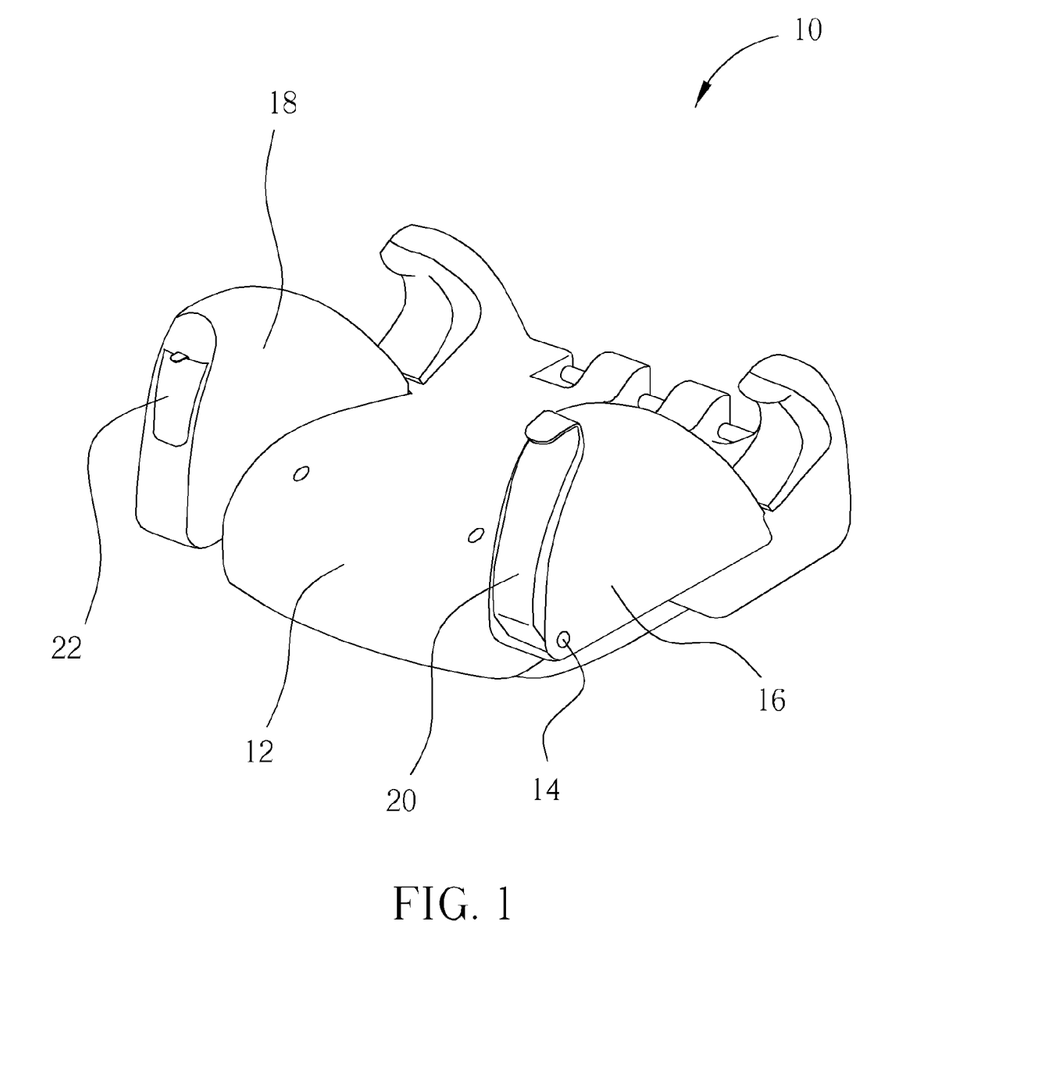
FIG. 1 is a partial diagram of a child safety seat according to a first embodiment of the present invention.
Figure 2:
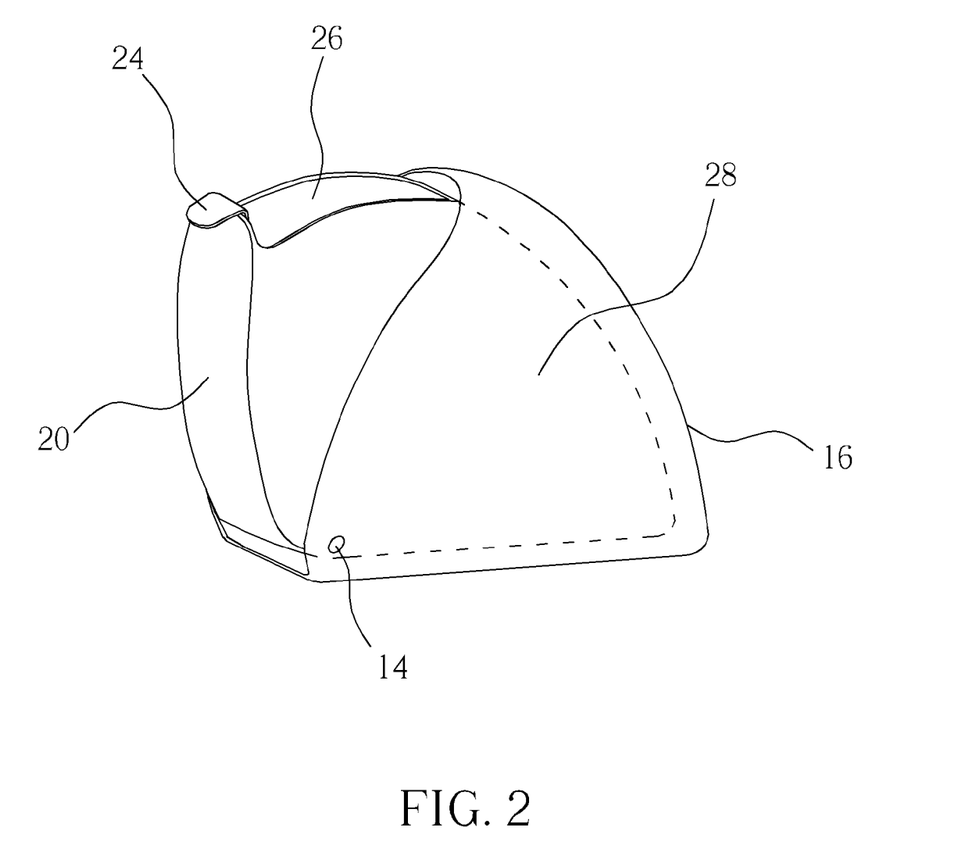
FIG. 2 is an enlarged diagram of the armrest base and the first storage structure in FIG. 1, and the first storage structure is in a first position.
Figure 3:
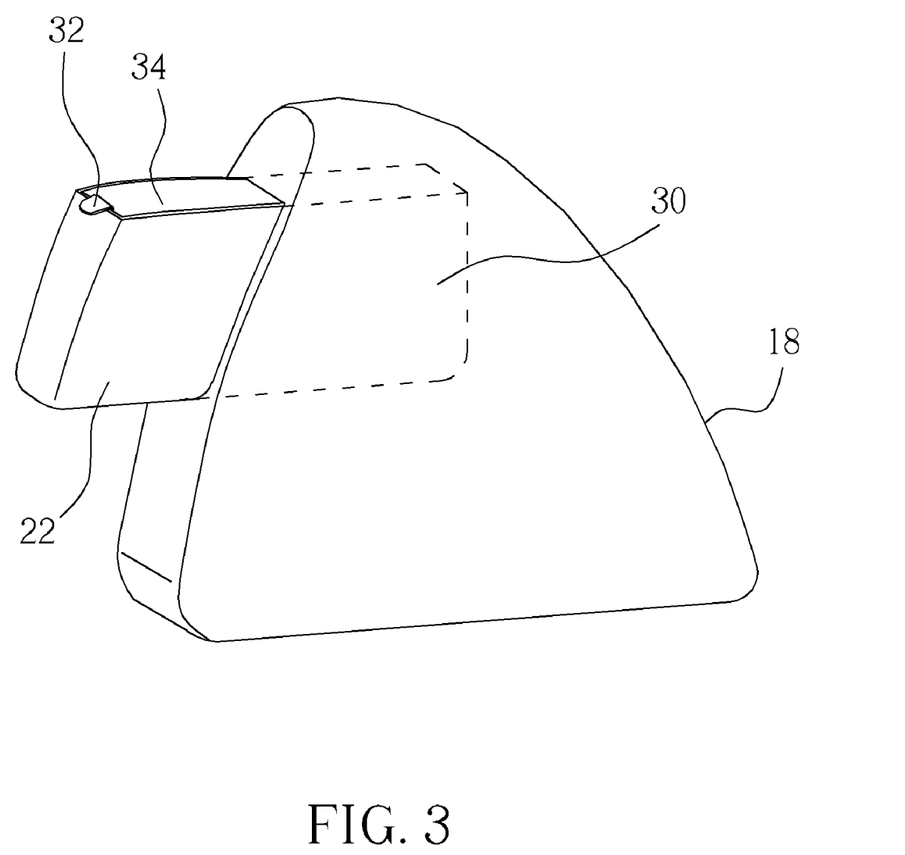
FIG. 3 is an enlarged diagram of the armrest base and the second storage structure in FIG. 1, and the second storage structure is in a first position.

Please refer to FIG. 1, which is a partial diagram of a child safety seat 10 according to a first embodiment of the present invention. As shown in FIG. 1, the child safety seat 10 comprises a seating base 12, a pivot shaft 14, two armrest bases 16, 18, a first storage structure 20, and a second storage structure 22. The seating base 12 is used for a baby seating. Two armrest bases 16, 18 are connected to two sides of the seating base 12, respectively. Please refer to FIG. 2, which is an enlarged diagram of the armrest base 16 and the first storage structure 20 in FIG. 1. The first storage structure 20 is disposed on the armrest base 16. The pivot shaft 14 is passed through the armrest base 16 and the first storage structure 20 so that the first storage structure 20 is connected to the armrest base 16 in a rotatable manner. As shown in FIG. 2, in this embodiment, the first storage structure 20 is a hollow fan-shaped structure, on which a pull tab 24 is projected formed. A first storage space 26 is formed in the first storage structure 20. The first storage space 26 is used for storing objects commonly used in baby care, such as toys and baby products, or for allowing a child sitting thereon to put his personal items. A receiving space 28 is formed in the armrest base 16. Please refer to FIG. 3, which is an enlarged diagram of the armrest base 18 and the second storage structure 22 in FIG. 1. As shown in FIG. 3, a receiving space 30 is formed in the armrest base 18. The second storage structure 22 is slidably mounted in the armrest base 18. The second storage structure 22 may be a drawer-shaped structure, on which a pull tab 32 is formed. A second storage space 34 is formed in the second storage structure 22. The second storage space 34 may be also used for storing objects commonly used in baby care, such as toys and baby products, or for allowing a child sitting thereon to put his personal items.

Figure 4:
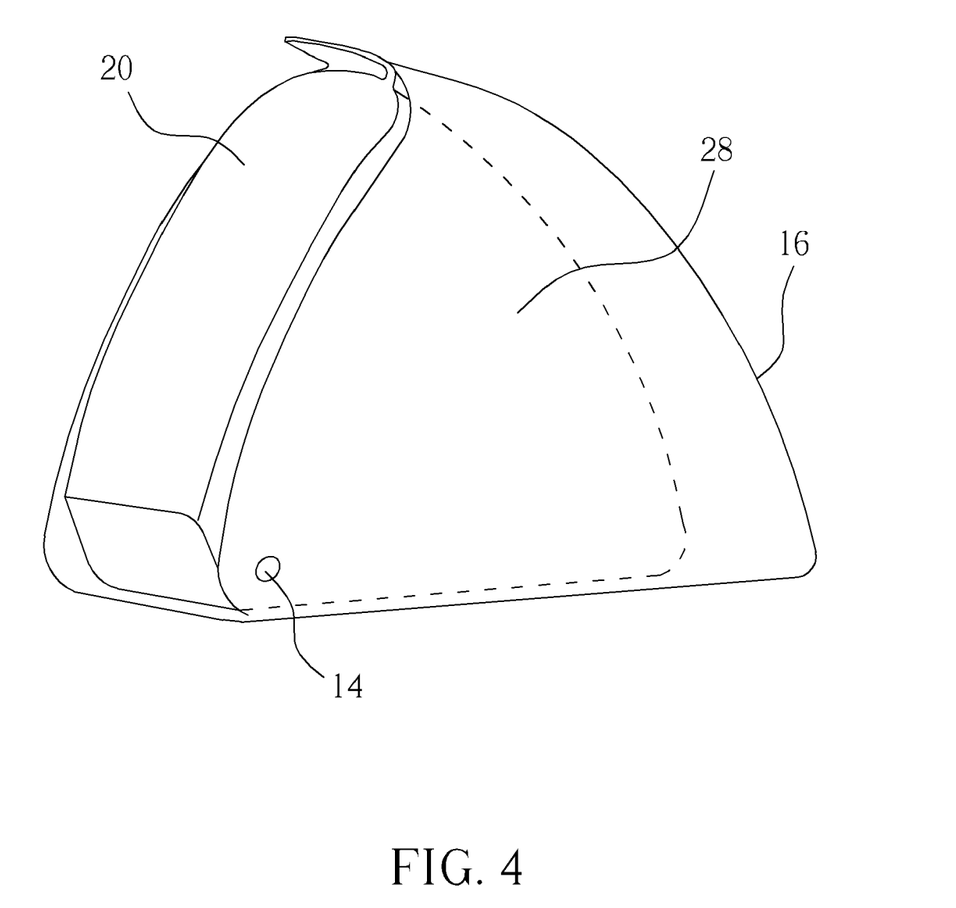
FIG. 4 is an enlarged diagram of the first storage structure in FIG. 2 being contained in the receiving space of the armrest base, and the first storage structure is in a second position.
Figure 5:
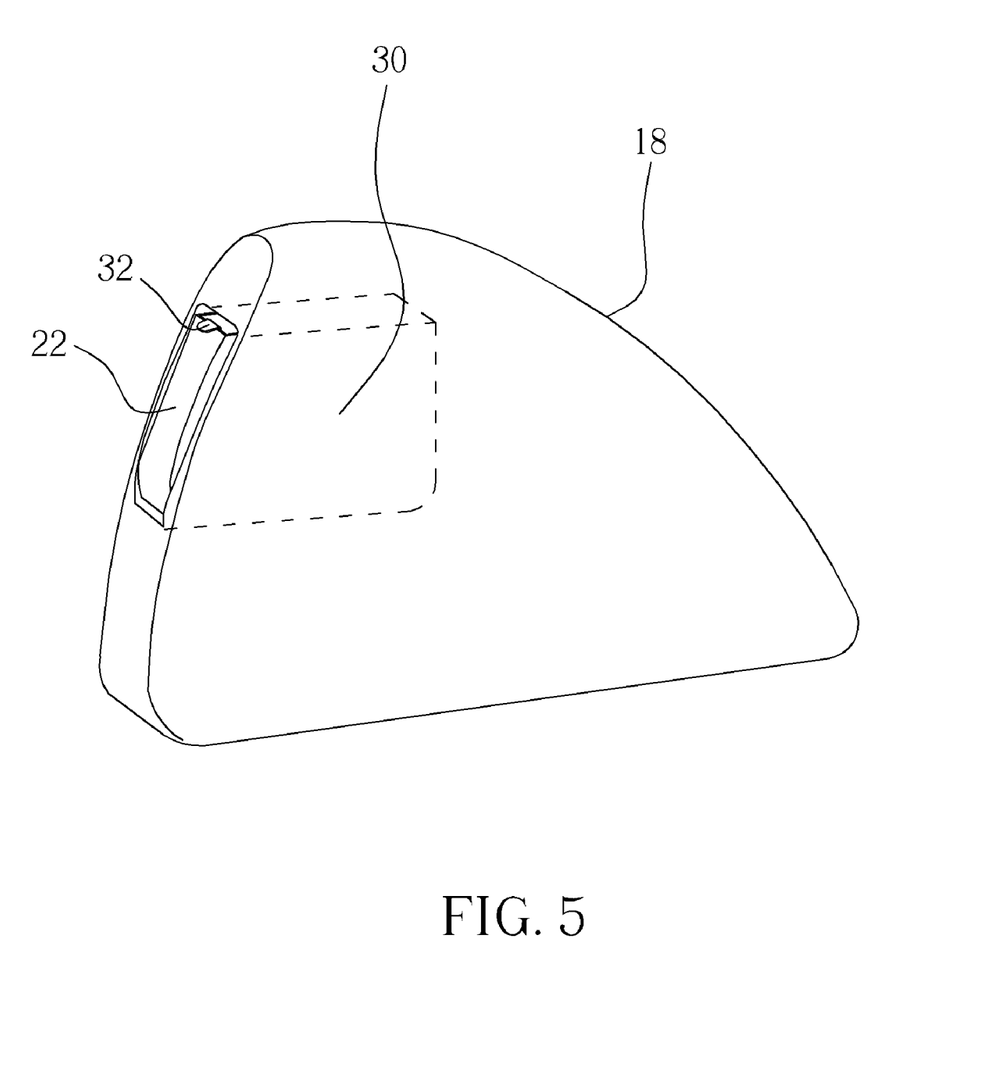
FIG. 5 is an enlarged diagram of the second storage structure in FIG. 3 being contained in the receiving space of the armrest base, and the second storage structure is in a second position.

More detailed description for the child safety seat 10 is provided as follows. Please refer to FIG. 2 and FIG. 3 at the same time. When a user (e.g. a baby sitting on the seating base 12, or a baby care giver) wants to take the objects stored in the first storage space 26 of the first storage structure 20, the user may simply need to pull the pull tab 24 on the first storage structure 20 to make the first storage structure 20 take the pivot shaft 14 as a rotating shaft to rotate to a first position shown in FIG. 2 relative to the armrest base 16. Thus, as shown in FIG. 2, the first storage space 26 of the first storage structure 20 may be exposed outside the receiving space 28 of the armrest base 16 for allowing the user to take the objects from the first storage space 26 easily. Similarly, when the user wants to take objects stored in the second storage space 34 of the second storage structure 22, the user may also need to pull the pull tab 32 of the second storage structure 34 to make the second storage structure 22 slide to a first position shown in FIG. 3 relative to the armrest base 18. Thus, the second storage space 34 of the second storage structure 22 may be exposed outside the receiving space 30 of the armrest base 18 for allowing the user to take the objects from the second storage space 34 easily. Please continue to refer to FIG. 4 and FIG. 5. FIG. 4 is an enlarged diagram of the first storage structure 20 in FIG. 2 being contained in the receiving space 28 of the armrest base 16. FIG. 5 is an enlarged diagram of the second storage structure 22 being contained in the receiving space 30 of the armrest base 18. As shown in FIG. 4 and FIG. 5, when the user does not need to take the objects from the first storage space 26 and the second storage space 34, or has already put the objects into the first storage space 26 and the second storage space 34, the user may need to push the first storage structure 20 to take the pivot shaft 14 as a rotating shaft to rotate to a second position shown in FIG. 4 relative to the armrest base 16, and push the second storage structure 22 to slide to a second position shown in FIG. 5 relative to the armrest base 18. As a result, the first storage structure 20 and the second storage structure 22 may be contained in the receiving space 28 of the armrest base 16 and the receiving space 30 of the armrest base 18, respectively. At this time, the first storage structure 20 and the second storage structure 22 may match the armrest bases 16 and 18 in shape to form a part of the armrest base 16 and a part of the armrest base 18, respectively, for providing an armrest function cooperatively. Furthermore, it should be mentioned that disposal of the first storage structure 20 and the second storage structure 22 may be not limited to the said structural design of the aforementioned embodiment. For example, disposal of the storage structure on the armrest base may be changed. One of the first storage structure 20 and the armrest base 16 and the second storage structure 22 and the armrest base 18 may be disposed on two sides of the seating base 12 respectively. In addition, one of the first storage structure 20 and the armrest base 16 and the second storage structure 22 and the armrest base 18 may be disposed on one side of the seating base 12, wherein a common armrest structure in the prior art may be disposed on another side of the eating base 12.

Figure 6:
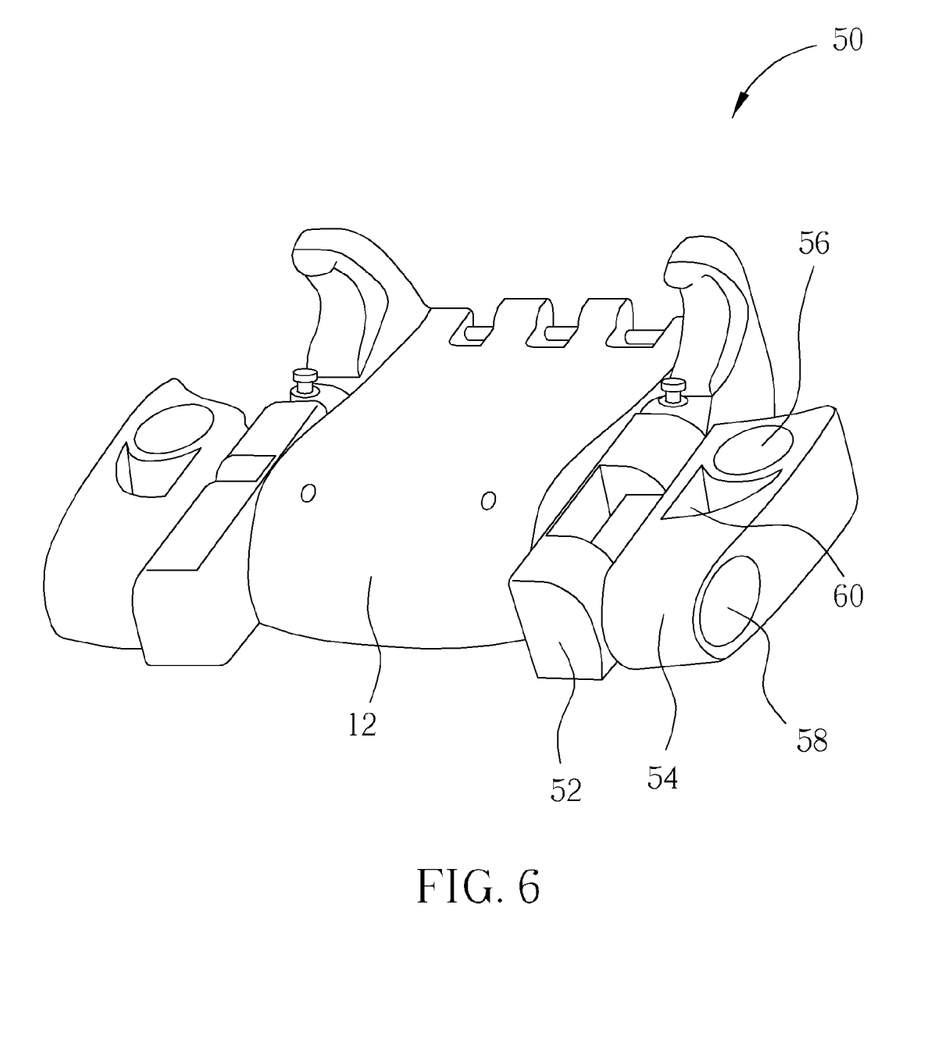
FIG. 6 is a partial diagram of a child safety seat according to a second embodiment of the present invention, and the storage structure is in a first position.
Figure 7:
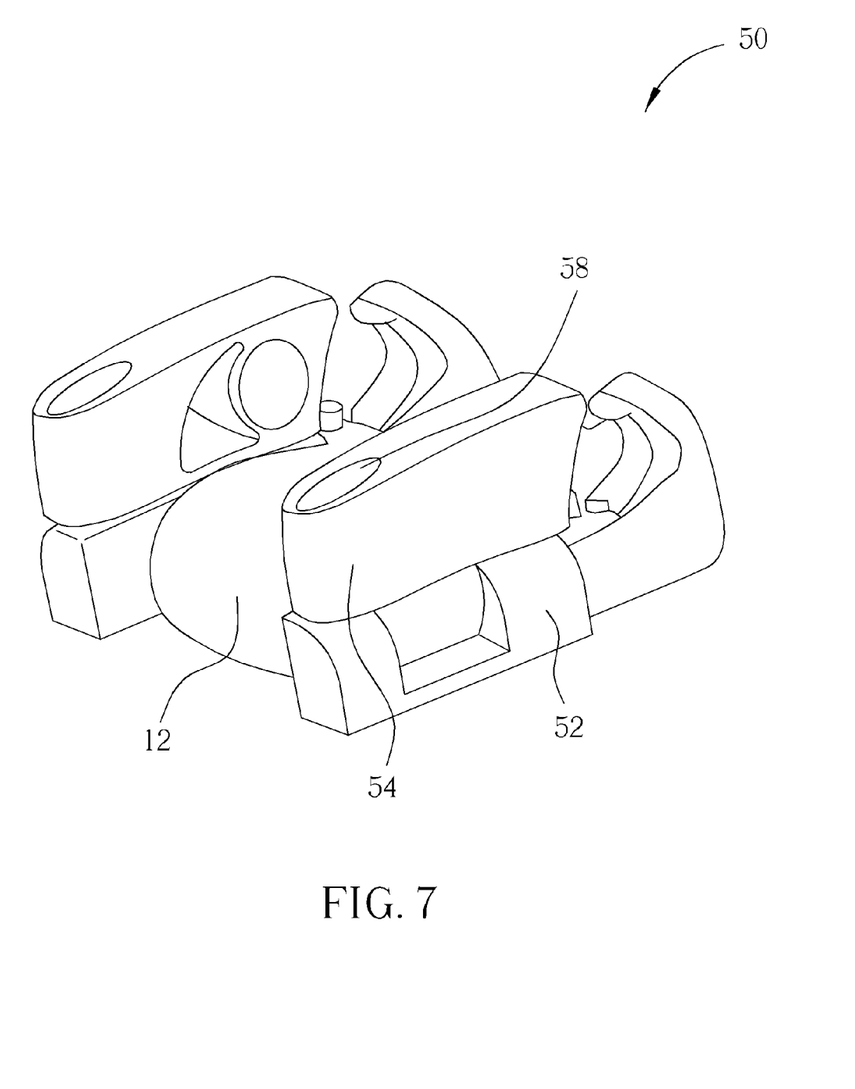
FIG. 7 is a diagram of the storage structure in FIG. 6 being located at a second position.

Please refer to FIG. 6, which is a partial diagram of a child safety seat 50 according to a second embodiment of the present invention. Components mentioned in the first and the second embodiments represent components with similar functions or similar structures. The difference between the child safety seat 50 and the child safety seat 10 is a storage structure and armrest base design. The child safety seat 50 comprises the seating base 12, an armrest base 52 disposed on a side of the seating base 12, and a storage structure 54. The storage structure 54 is connected to the armrest base 52 in a rotatable manner. A first storage space 56 and a second storage space 58 may be formed on different planes of the storage structure 54. As shown in FIG. 6, the first storage space 56 and the second storage space 58 maybe used for storing objects commonly used in baby care, such as a baby bottle, a drink bottle, and so on. The storage structure 54 is rotatable between a first position shown in FIG. 6 and a second position shown in FIG. 7. When the storage structure 54 is located at the first position shown in FIG. 6, the storage structure 54 may is lay down at a side of the armrest base 52 and has substantially same plane with the seating base 12. As a result, the first storage space 56 of the storage structure 54 may be located at the outside of the armrest base 52 with its opening facing up. When the storage structure 54 is located at the second position shown in FIG. 7, the storage structure 54 is standing on the armrest base 52 for providing an armrest function cooperatively with the armrest base 52. At this time, the second storage space 58 may be located on the armrest base 52 with its opening facing up for allowing the user to put or take the objects easily. Thus, no matter whether the user rotates the storage structure 54 to the first position shown in FIG. 6 or to the second position shown in FIG. 7 relative to the armrest base 52, the storage structure 54 may provide the corresponding storage space accordingly. In this embodiment, the storage structure 54 further has a third storage space 60 formed at a side of the first storage space 56 for storing objects of different shapes.

Figure 8:
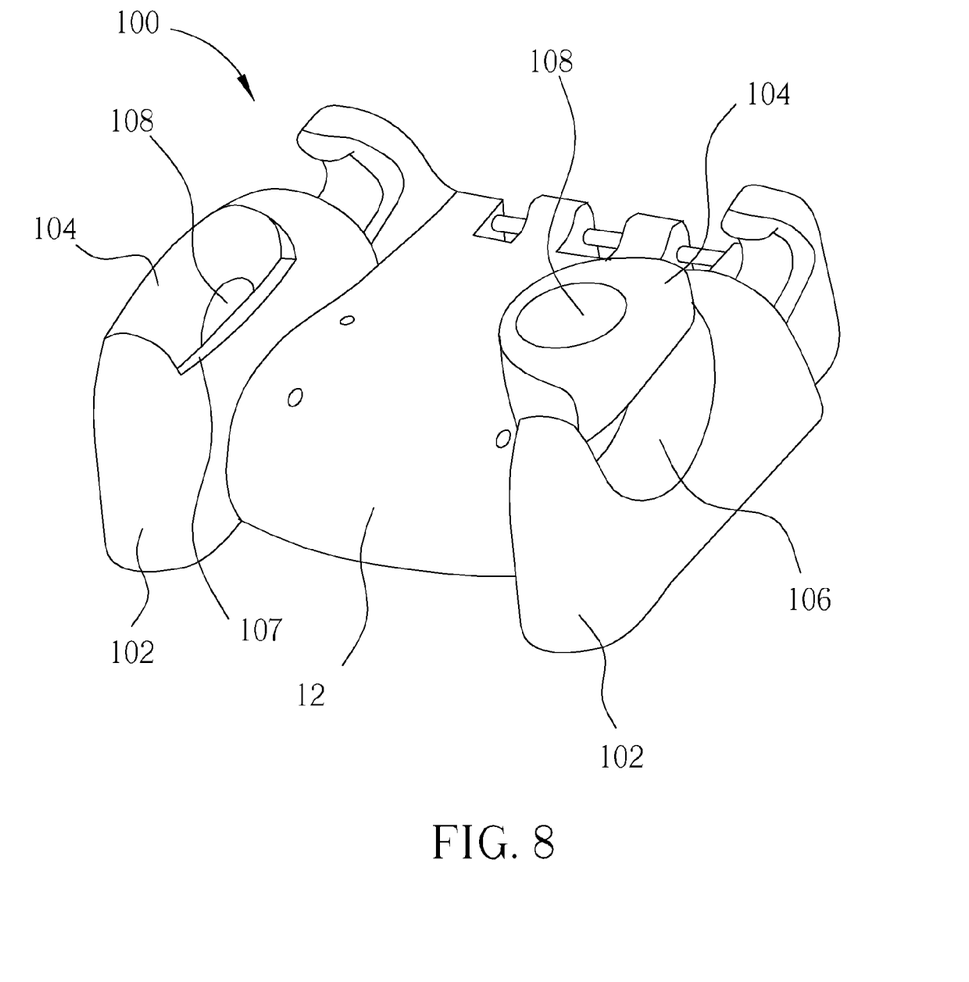
FIG. 8 is a partial diagram of a child safety seat according to a third embodiment of the present invention.
Figure 9:
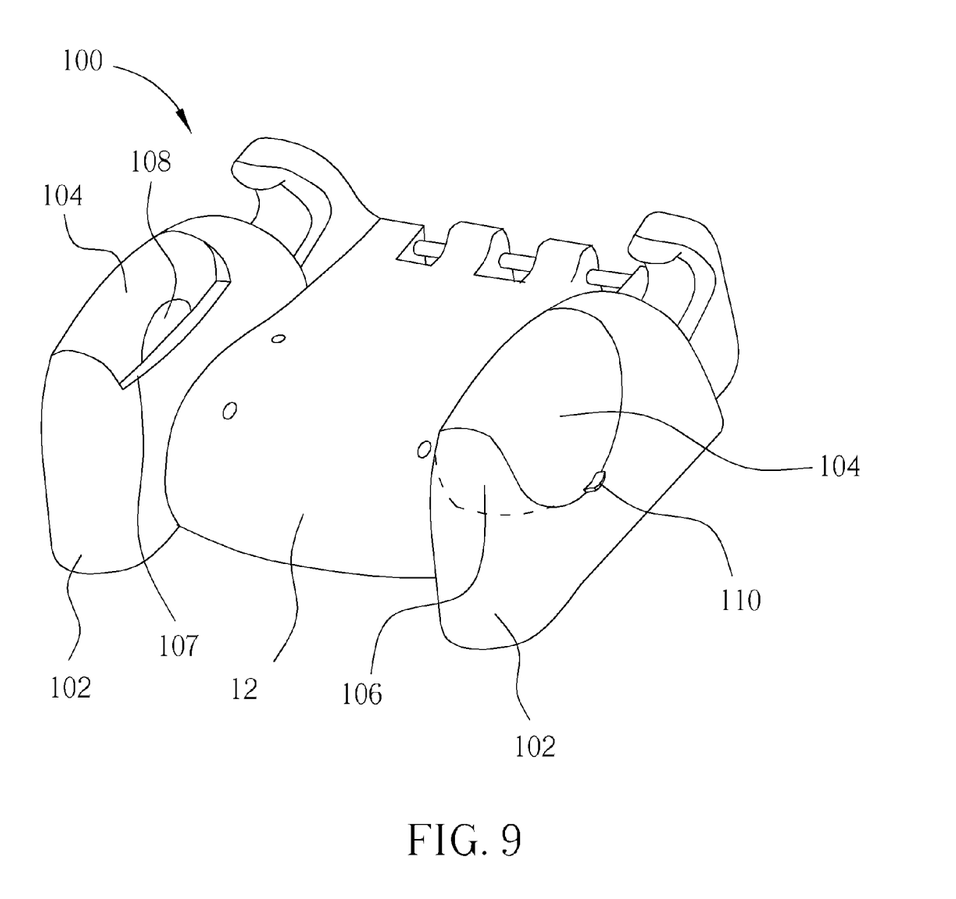
FIG. 9 is a diagram of the storage structure in FIG. 8 being contained in the armrest base and located at a second position.

Next, please refer to FIG. 8, which is a partial diagram of a child safety seat 100 according to a third embodiment of the present invention. Components mentioned in both the third and the second embodiments represent components with similar functions or similar structures, and the related description is therefore omitted herein. The difference between the child safety seat 100 and the child safety seat 50 in the second embodiment is a storage structure and armrest base design. As shown in FIG. 8, two sides of the seating base 12 of the child safety seat 100 have the same structure. For simplicity, more detailed for the structure of one side of the eating base 12 is provided as follows. The child safety seat 100 comprises the seating base 12, an armrest base 102 disposed on a side of the seating base 12, and a storage structure 104 pivotally connected to the armrest base 102. A receiving space 106 is formed on the armrest base 102, and a storage space 108 is formed on the storage structure 104. When the user does not need to use the storage function provided by the child safety seat 100, the storage structure 104 may be located at a second position, shown in FIG. 9, and contained in the receiving space 106 of the armrest base 102. At this time, the storage structure 104 may match the armrest base 102 in shape and form as a part of the armrest base 102 for reducing space occupied by the storage structure 104. As shown in FIG. 9, the storage structure 104 has a pull tab 110, and the armrest base 102 has a side wall 107 that defines one side wall of the receiving space 106. Thus, when the user wants to put a suitable object into the storage space 108, the user may simply need to pull the pull tab 110 of the storage structure 104 to rotate the storage structure 104 an angle (about 270°) to a first position shown in FIG. 8, and then the storage structure 104 may lean on the side wall 107 horizontally. Thus, the storage space 108 of the storage structure 104 maybe located on the armrest base 102 with its opening facing up for allowing the user to put the objects in easily.

Figure 10:
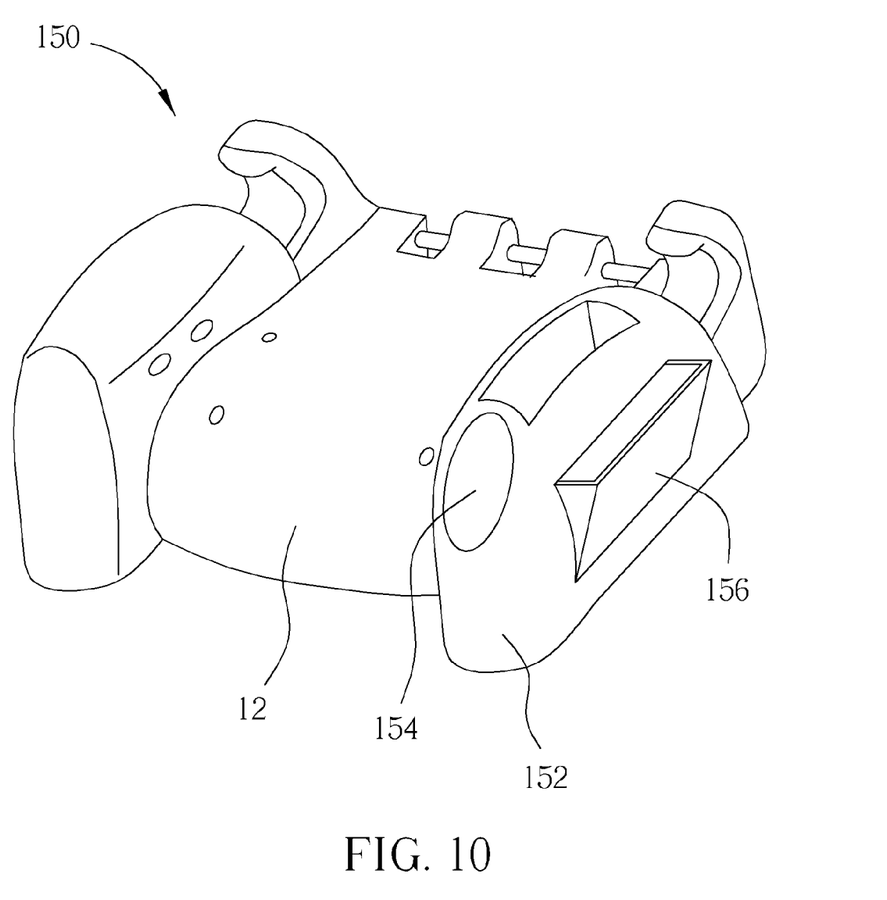
FIG. 10 is a partial diagram of a child safety seat according to a fourth embodiment of the present invention.
Figure 11:
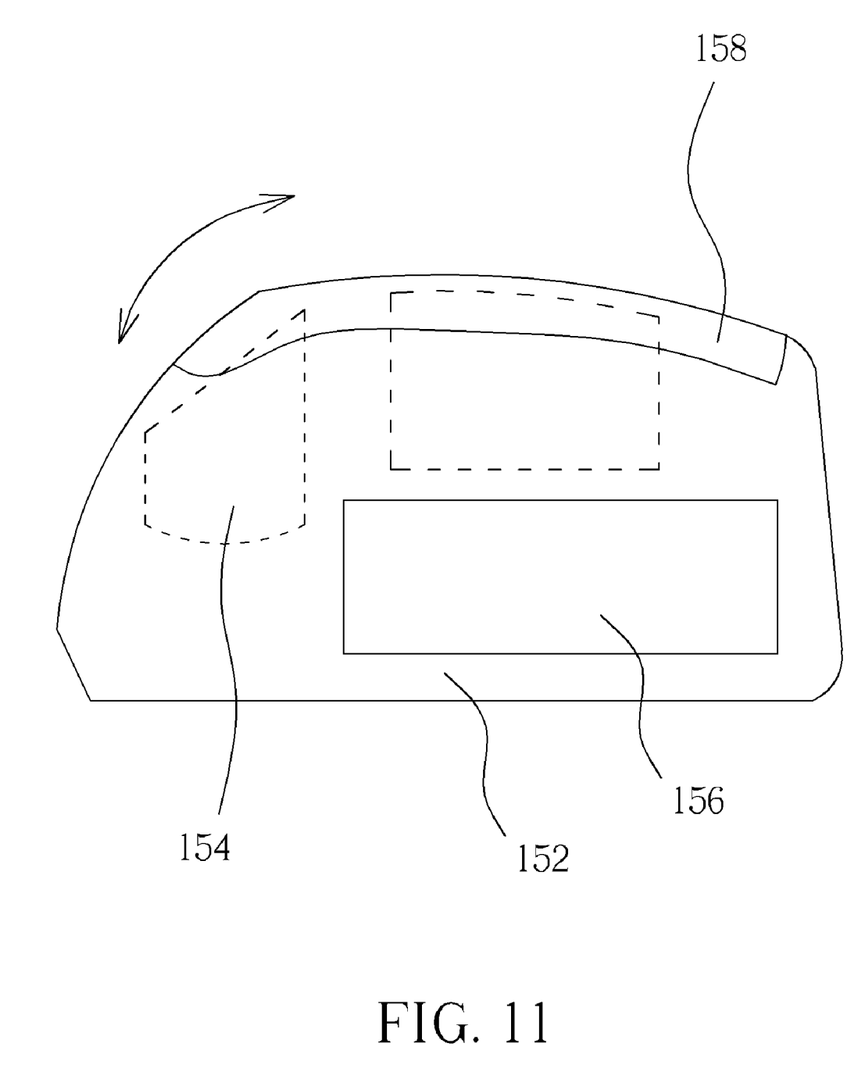
FIG. 11 is a lateral diagram of disposing an upper lid on the armrest base in FIG. 10.

Furthermore, in the embodiments of the present invention, the storage structure and the armrest base may be formed integrally instead of the said structural design employing two independent parts. For example, please refer to FIG. 10, which is a partial diagram of a child safety seat 150 according to a fourth embodiment of the present invention. Components mentioned in both the first and the fourth embodiments represent components with similar functions or similar structures, and the related description is therefore omitted herein. The child safety seat 150 comprises the seating base 12, an armrest base 152, and a storage structure 154. The storage structure 154 may be a cup holder or other structure for storing objects. The storage structure 154 maybe integrally formed on the armrest base. As shown in FIG. 10, a side of the armrest base 152 opposite to the seating base 12 has an extending receiving structure 156 for containing book-sized objects. The number of the said storage structure may be increased to two or more based on practical application needs (as shown in FIG. 10). In addition, in the embodiment of the armrest base being formed with the storage structure integrally, a movable lid may be additionally disposed on the armrest base 152 for object protection. For example, please refer to FIG. 11, which is a lateral diagram of disposing an upper lid 158 on the armrest base 152 in FIG. 10. As shown in FIG. 11, the upper lid 158 is connected to the armrest base 152 in a rotatable manner. When the upper lid 158 rotates to a position shown in FIG. 11 relative to the armrest base 152, the upper lid 158 may cover the storage structure 154. In other words, the user may open or close the upper lid 158 according to the directions indicated by the arrows shown in FIG. 11 for taking out of, or putting objects into, the storage structure 154.

Figure 12:
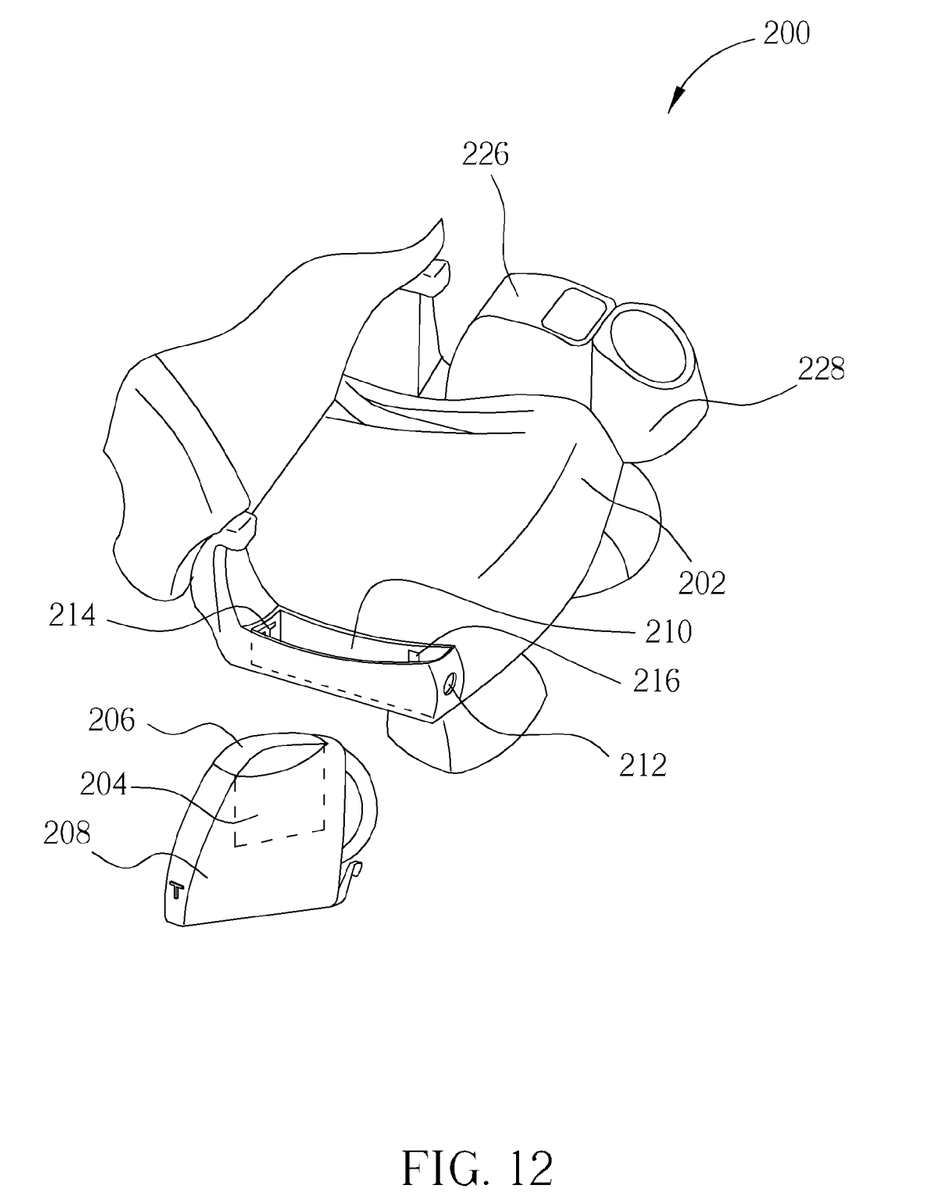
FIG. 12 is a partial diagram of a child safety seat according to a fifth embodiment of the present invention.
Figure 13:
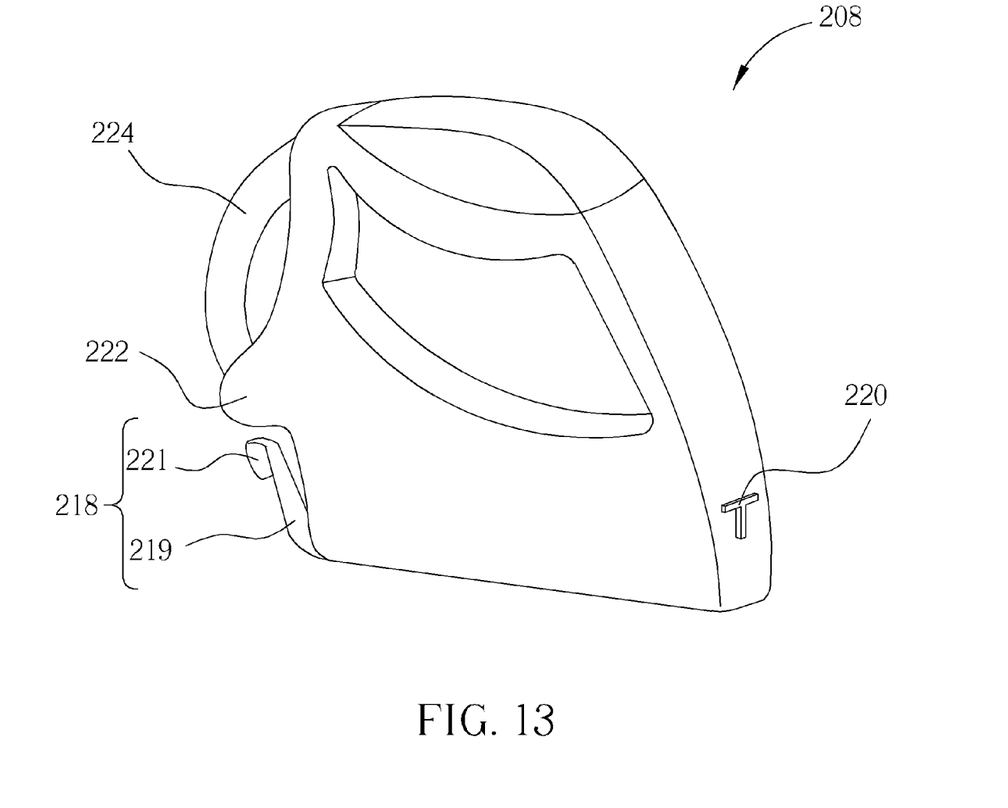
FIG. 13 is an enlarged diagram of the armrest base in FIG. 12.
Figure 14:
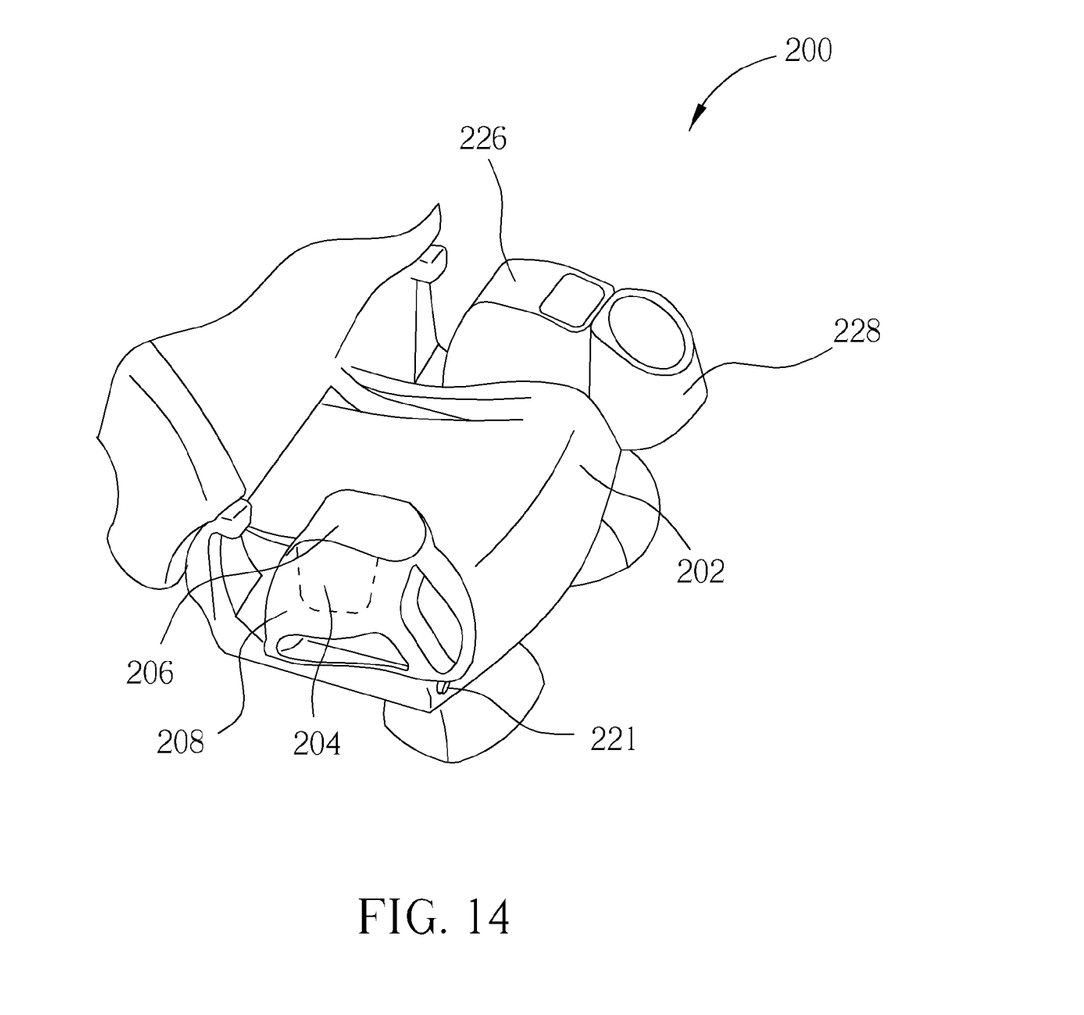
FIG. 14 is an assembly diagram of the child safety seat in FIG. 12.

Finally, please refer to FIG. 12, which is a partial diagram of a child safety seat 200 according to a fifth embodiment of the present invention. Similar components mentioned in the fifth embodiment and the above embodiments represent components with similar functions or similar structures, and the related description is therefore omitted herein. The difference between the child safety seat 200 and the child safety seats in the said embodiments is that an armrest base in the fifth embodiment may be disposed detachably on a seating base. The child safety seat 200 comprises a seating base 202, a storage structure 204, an upper lid 206, and an armrest base 208. An engaging slot 210 is formed on a side of the seating base 202. A first opening 212, a second opening 214, and a hole 216 are formed on the walls that defines the engaging slot 210. The storage structure 204 and the armrest base 208 are formed integrally, and the upper lid 206 is connected to a side of the storage structure 204 in a rotatable manner for covering the storage structure 204. The armrest base 208 is detachable coupled with the engaging slot 210. Please refer to FIG. 12 and FIG. 13 at the same time. FIG. 13 is an enlarged diagram of the armrest base 208 in FIG. 12. As shown in FIG. 13, the armrest base 208 comprises a button structure 218, a protruding structure 220, a hook structure 222, and a handle 224. The button structure 218 and the protruding structure 220 are disposed on two bottom parts of the armrest base 208, respectively. In this embodiment, the button structure 218 comprises an elastic arm 219 and a bump 221 formed on an end of the elastic arm 219. The bump 221 of the button structure 218 and the protruding structure 220 are used for engaging with the first opening 212 and the second opening 214, respectively, when the armrest base 208 is installed in the engaging slot 210. As shown in FIG. 13, the handle 224 is disposed on the upper part of the armrest base 208 corresponding to the same side of the button structure 218. The hook structure 222 is disposed under the handle 224. The hook structure 222 is used for engaging with the hole 216 when the armrest base 208 is installed in the engaging slot 210. Thus, when the user wants to install the armrest base 208 on the seating base 202, the user may grab the handle 224 or the upper part of the armrest base 208, and then engage the protruding structure 220 and the hook structure 222 with the second opening 214 and the hole 216, respectively. At the same time, the bump 221 of the button structure 218 may be engaged with the first opening 212 by elastic force provided from the elastic arm 219. Subsequently, the armrest base 208 may be secured to the seating base 202 (as shown in FIG. 14). At this time, the bump 221 may protrude from the first opening 212 of the engaging slot 210. In such a manner, the user may be able to take the objects stored in the storage structure 204 shown in FIG. 12 after opening the upper lid 206. On the other hand, if the user wants to detach the armrest base 208 from the seating base 202 for providing more space for the baby or reducing space occupied by the child safety seat 200, the user may simply press the bump 221 of the button structure 218 to leave the first opening 212, and then pull the handle 224 to separate the protruding structure 220 and the hook structure 222 from the second opening 214 and the hole 216. As a result, the armrest base 208 maybe detached from the seating base 202 accordingly. After the armrest base 208 is detached from the engaging slot 210 of the seating base 202, the engaging slot 210 may be used for containing objects. Furthermore, as shown in FIG. 14, the configuration of the armrest base and the storage structure shown in FIG. 10 may also be assembled to another side of the seating base 202. That is to say, an armrest base 226 and a storage structure 228 may be disposed on another side of the seating base 202. The storage structure 228 may be a cup holder or other structure for storing objects. The storage structure 228 may be integrally formed with the armrest base 226. Similarly, the number of the said storage structure may be increased to two or more (as shown in FIG. 14) according to practical application needs.

It should be mentioned that all the configuration principles and the structural designs of the said seating bases, the armrest bases, and the storage structures may be applied interchangeably between the embodiments of the present invention so that design variety may be given to the storage applications in the child safety seat of the present invention.

Compared with the prior art, in which only safety design is added to a child safety seat structure, the child safety seat of the embodiments of the present invention utilizes extra disposal of a storage structure on an armrest base to allow a baby care giver to put baby products or baby favorite toys into a storage space provided by the storage structure. Thus, not only may the baby care giver easily take objects from the storage structure when taking care of the baby in the child safety seat, but the baby may also enjoy some recreational activities via the toys stored in the storage space. In such a manner, according to the present invention, convenience of a child safety seat in use may be increased considerably.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
    a seating base;
    an armrest base disposed on a side of the seating base; and
    a storage structure pivotally connected to the armrest base for rotating between a first position and a second position, a first storage space and a second storage space being formed in the storage structure;
    wherein the first storage space and the second storage space are located on different planes of the storage structure, the storage structure is pivoted to an outer side of the armrest base, the storage structure has a bottom surface lying in substantially the same plane as a bottom surface of the seating base and further has an opening of the first storage space facing up for storing objects when the storage structure is in the first position, and the storage structure is stacked on a top side of the armrest base and forms an extension of the armrest base and an opening of the second storage space of the storage structure faces up when the storage structure is in the second position.

* * * * *